Sept. 28, 1954    S. BRAND ET AL    2,690,221
PUNCHING MACHINE FOR PUNCHING AND HANDLING
RECORDS, SUCH AS CHECKS OF VARIOUS SIZES
Filed April 11, 1952    14 Sheets-Sheet 1
FIG. 1
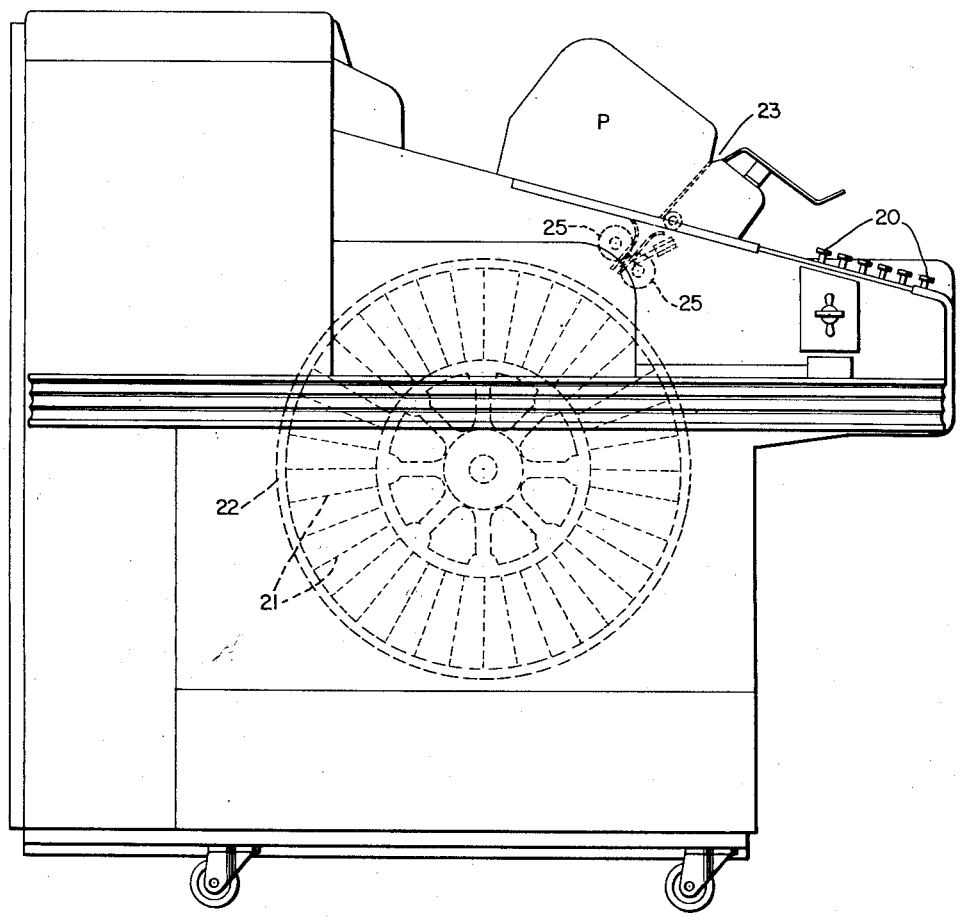
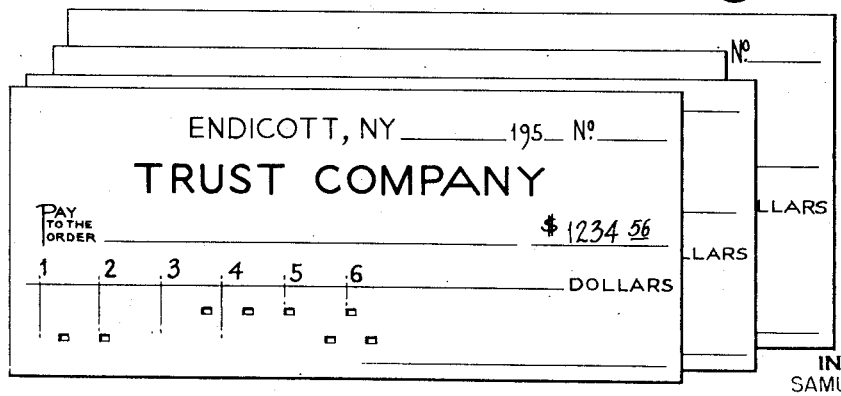
FIG. 2
INVENTORS
SAMUEL BRAND
DONALD W. HANEY
BY
ATTORNEY Sept. 28, 1954     S. BRAND ET AL     2,690,221
PUNCHING MACHINE FOR PUNCHING AND HANDLING
RECORDS, SUCH AS CHECKS OF VARIOUS SIZES
Filed April 11, 1952     14 Sheets-Sheet 3

INVENTORS
SAMUEL BRAND
DONALD W. HANEY
BY
J. W. Lonniger
ATTORNEY

INVENTORS
SAMUEL BRAND
DONALD W. HANEY
ATTORNEY

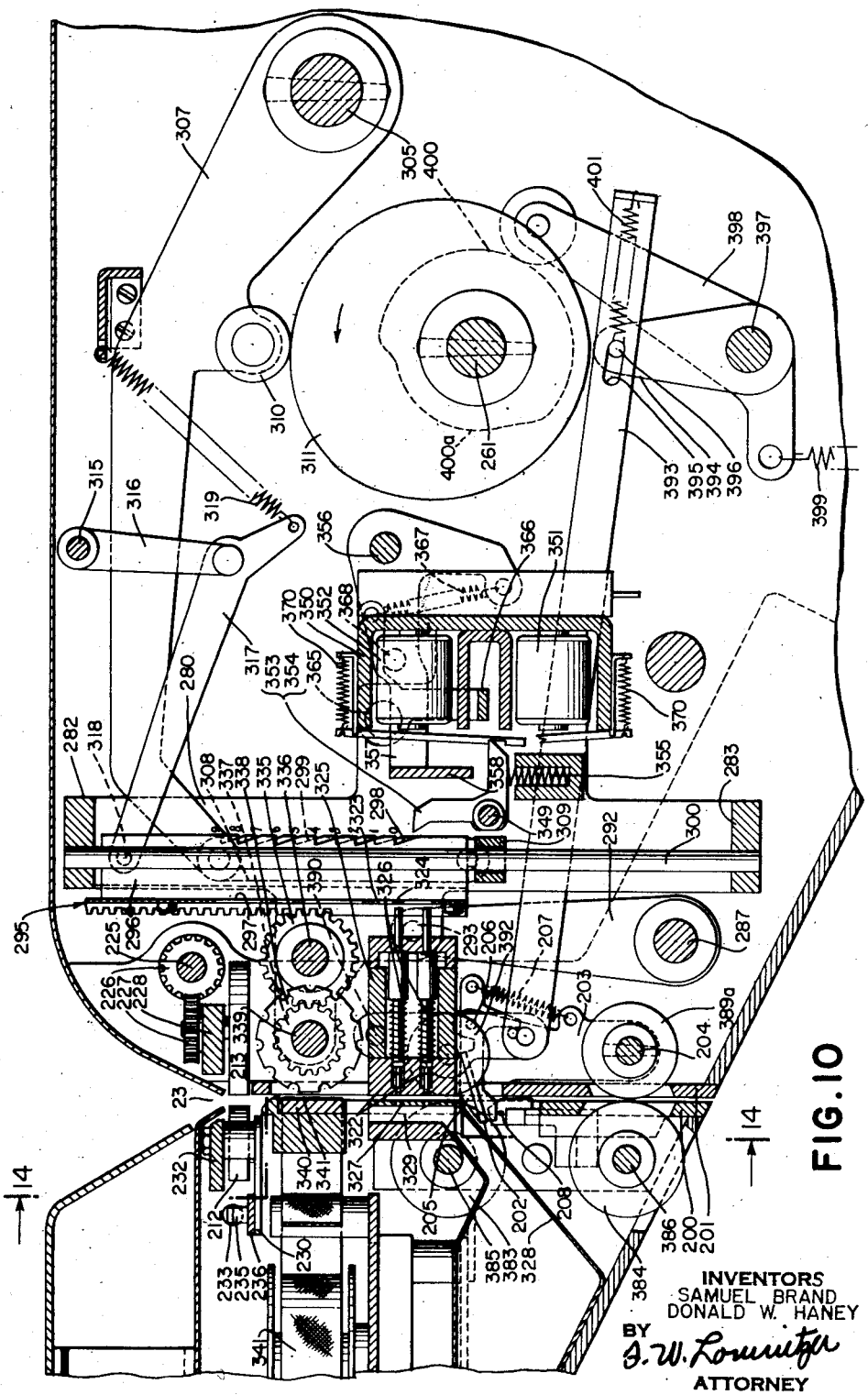

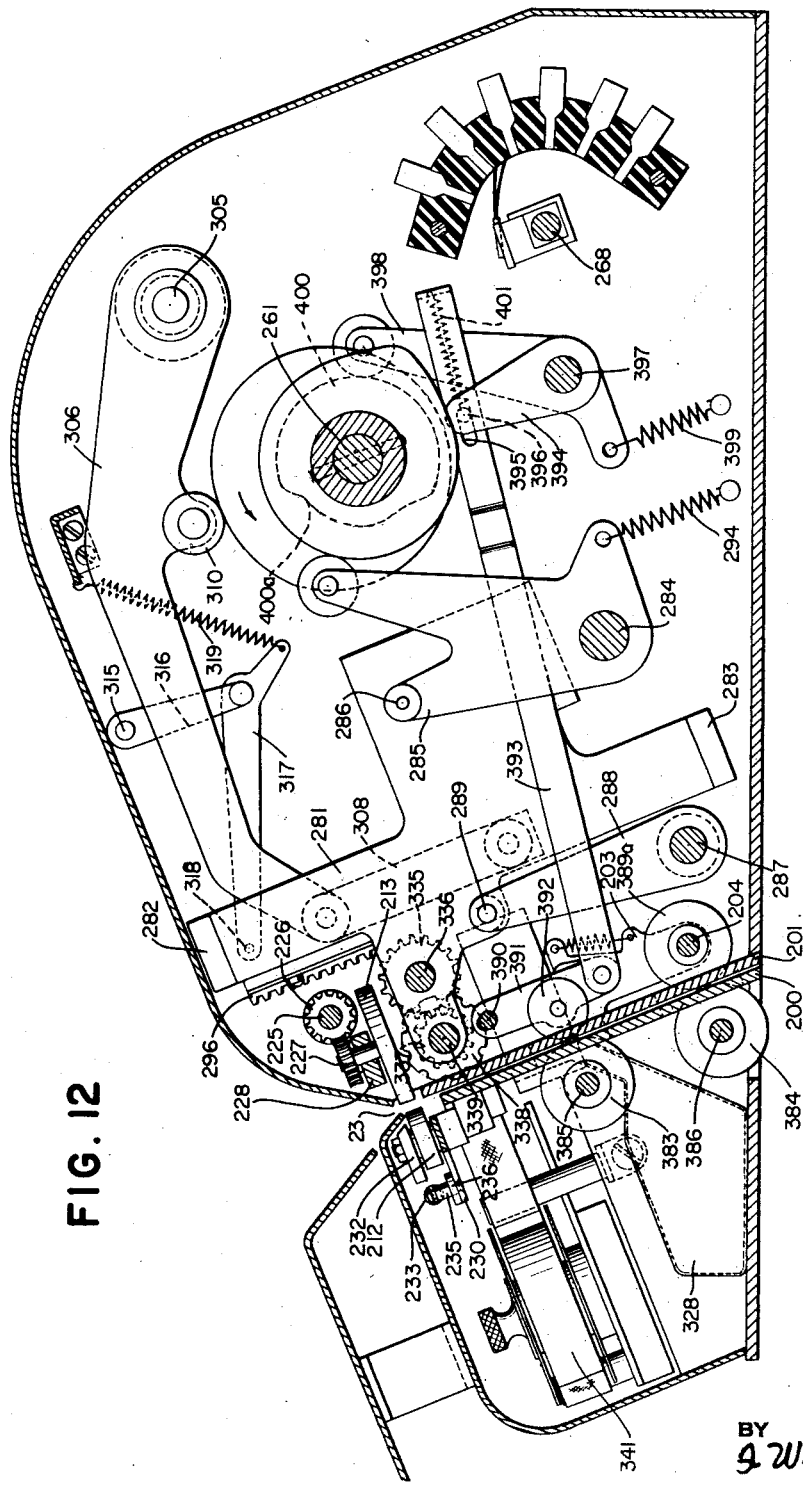

Sept. 28, 1954  S. BRAND ET AL  2,690,221
PUNCHING MACHINE FOR PUNCHING AND HANDLING
RECORDS, SUCH AS CHECKS OF VARIOUS SIZES
Filed April 11, 1952  14 Sheets-Sheet 11

INVENTORS
SAMUEL BRAND
DONALD W. HANEY
BY
*J. W. Lonnitzer*
ATTORNEY

INVENTORS
SAMUEL BRAND
DONALD W. HANEY
BY
*F. W. Lonmiger*
ATTORNEY

INVENTORS
SAMUEL BRAND
DONALD W. HANEY

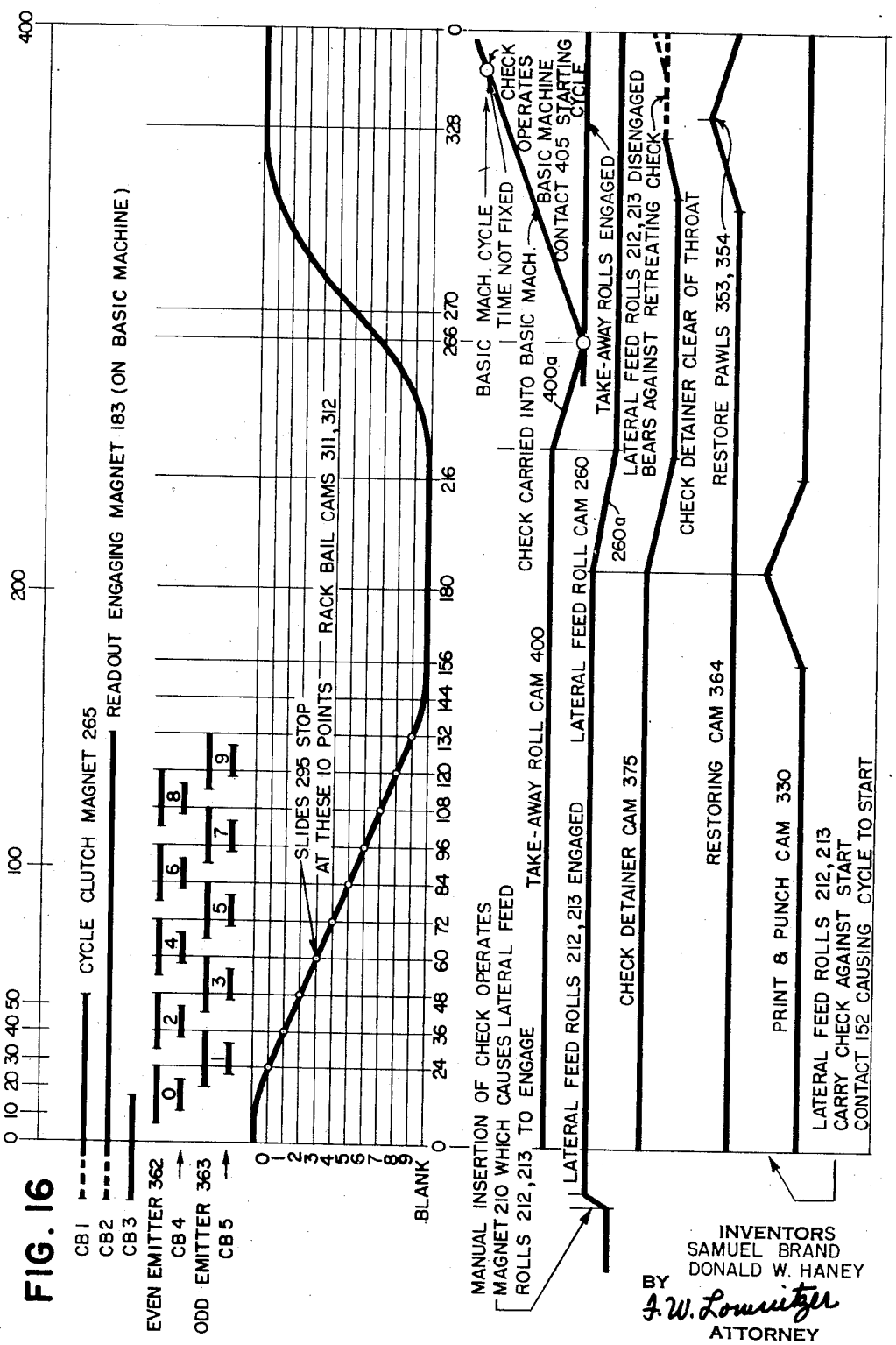

Patented Sept. 28, 1954

2,690,221

UNITED STATES PATENT OFFICE 2,690,221

PUNCHING MACHINE FOR PUNCHING AND HANDLING RECORDS, SUCH AS CHECKS OF VARIOUS SIZES

Samuel Brand, Binghamton, and Donald W. Haney, Vestal, N. Y., assignors to International Business Machines Corporation, New York, N. Y., a corporation of New York Application April 11, 1952, Serial No. 281,862

7 Claims. (Cl. 164—113)

This invention relates to punching machines and more particularly to the type which effects punching of a record inserted in the punching mechanism to represent an amount which is in accordance with an amount previously set up by a keyboard.

Heretofore, when such records were of the same dimensions no particular problem arose in presenting such records to a punching mechanism so that the location of punched holes will be at predetermined points in order that they will be registered with the sensing mechanisms of another machine that such punched records are to control.

However, when it is desired to punch records having variable sizes, such as checks which now come in different widths and lengths, the location of the holes must be at the same places for all records or checks in order to be properly registered with the sensing mechanism.

An object of the present invention is to provide means to insure the proper displacement of a check in the punching mechanism in both directions prior to feeding the check into the punching mechanism.

A further object of the present invention is to provide means to insure that when a check or record is inserted in the punching mechanism its bottom edge will be at the proper position before punching can be effectuated.

A still further object of the invention is to provide means to automatically cause the lateral displacement of the inserted record or check preferably after its bottom edge is properly located to the exact position necessary for punching holes in the required places.

A further object of the invention is the provision of electrical contact means which cooperate with the bottom edge of the record to insure its exact position with regard to the punching mechanism and which contact means must be closed before the further operation of the machine can be carried out.

A still further object of the invention is the provision of electrical contact means which are actuated when the lateral displacement of the record is completed to initiate the further operation of the machine.

The present improvements are preferably incorporated in a form of combined sorting and accounting machine shown in the U. S. Patent to F. L. Fuller and S. Brand, No. 2,142,352, to enable records to be punched according to amounts set up in a ten-key keyboard of the acocunting machine prior to their sorting in a plurality of compartments. While this has been attained in the patent to S. Brand No. 2,161,612, the punching arrangement therein was only adapted to punch statistical cards of equal sizes which were to be utilized in card controlled accounting machines. This punching arrangement was not adapted to handle and punch paper checks of various widths and lengths. It is, therefore, an additional object of the present invention to devise a check punching arrangement which can receive and punch paper checks of variable sizes and with provisions of means to handle and centralize the checks in a punching mechanism irrespective of their sizes, so that punched holes can be made at predetermined points in order that they will be registered with the sensing mechanisms of another machine that such punched checks are to control.

A still further object of the present invention is the provision of an electrical setup or digit representing mechanism set up under control of a ten-key keyboard from which amounts may be derived or read out to control desired recording mechanisms, such as the punching mechanism herein.

It has also been contemplated in French Patent, No. 968,468 to provide for punching of checks of various sizes at exact places by the use of a pilot hole on the check which determines the lateral displacement of the check. The present arrangement not only eliminates the requirement of such pilot holes but the sensing mechanism therefor, and also the control by the latter of the check feeding mechanism.

Other objects of the invention will be pointed out in the following description and claims and illustrated in the accompanying drawings, which disclose, by way of example, the principle of the invention and the best mode, which has been contemplated, of applying that principle.

In the drawings:

Fig. 1 is a view in side elevation showing a well known form of combined check sorting and accounting in which the present improvements are preferably incorporated.

Fig. 2 is a plan view showing as an example a series of differently sized checks, the top check of which is shown printed and punched so that it may be used as a control instrumentality in a record controlled machine to list and accumulate the amount represented thereon.

Figure 7:
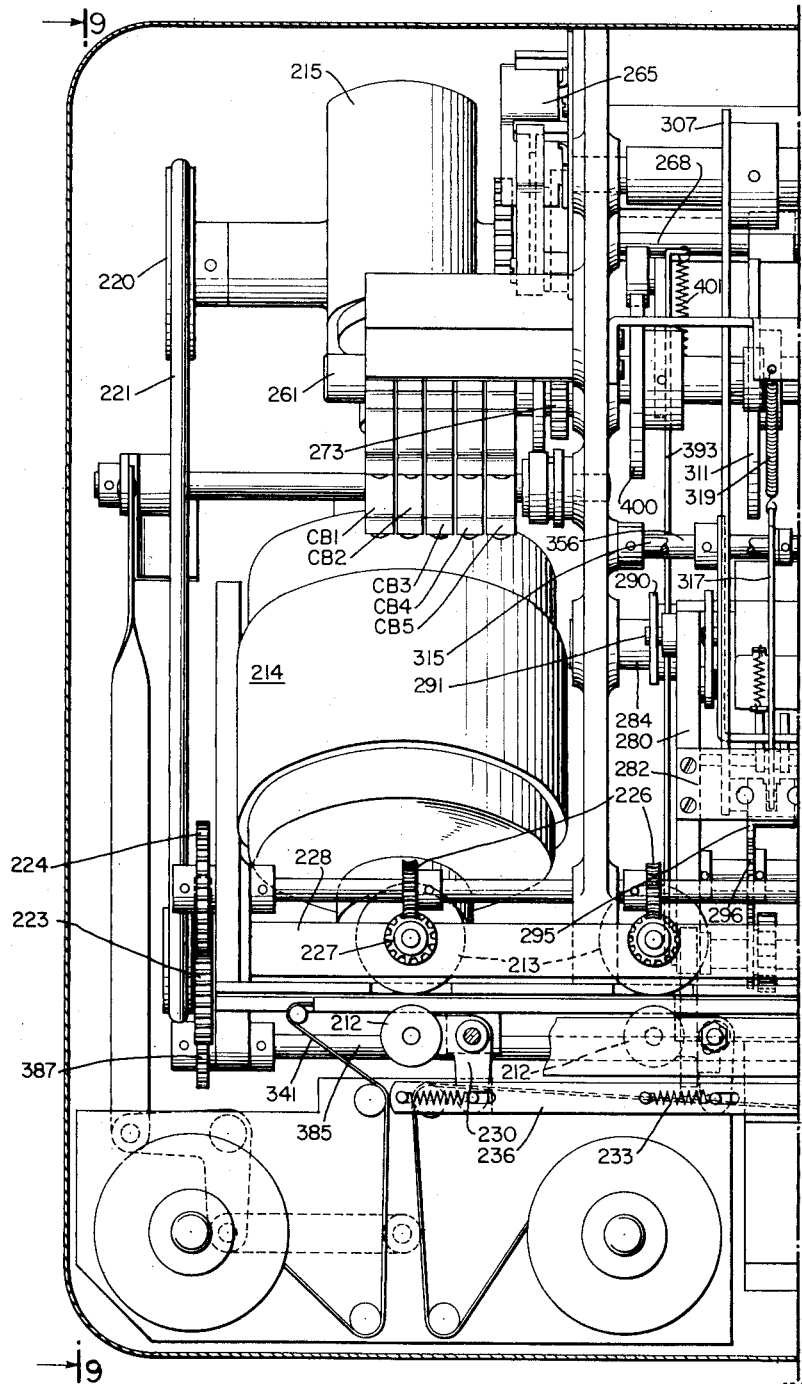
Figure 8:
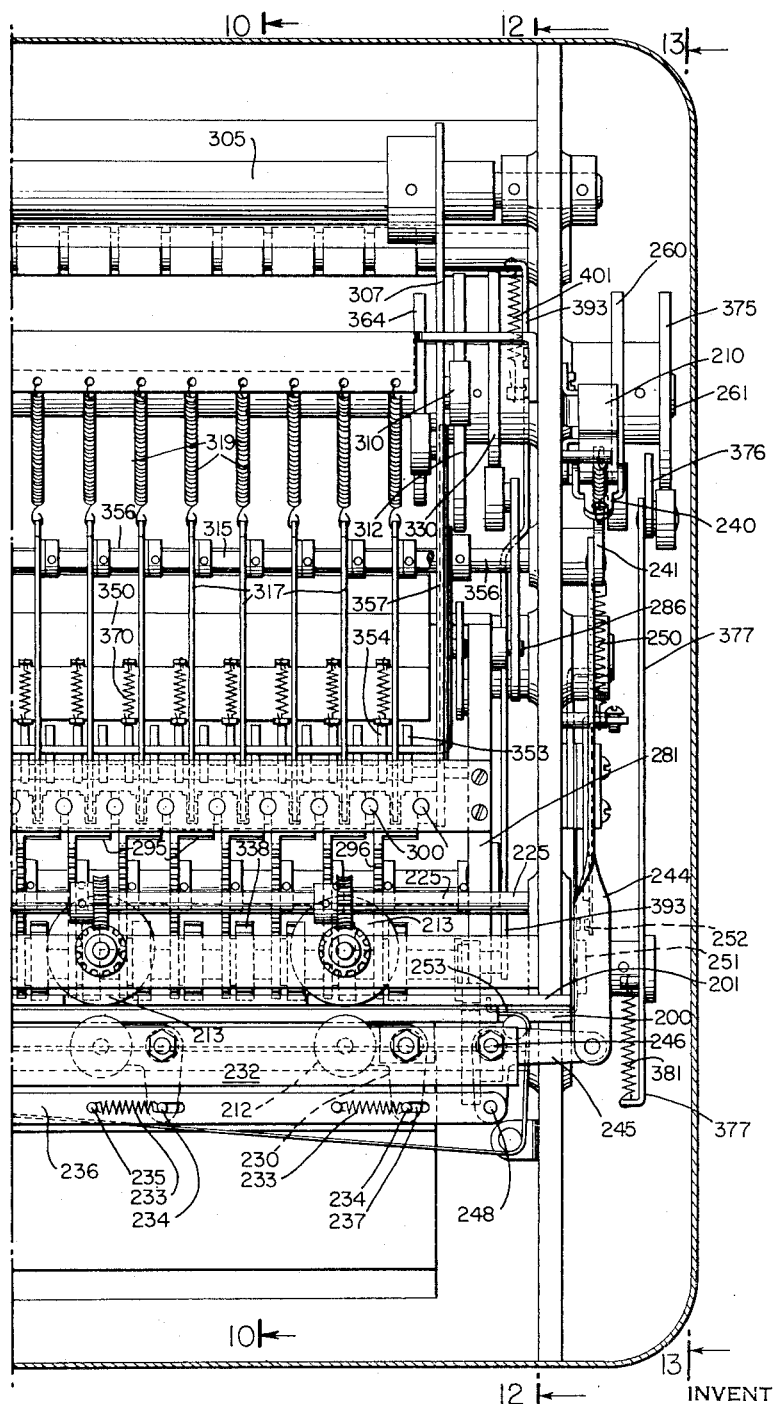

Figs. 7 and 8 when assembled in the named order show a plan view of the parts comprising the improvements in the check punching and printing mechanisms.

Figure 9:
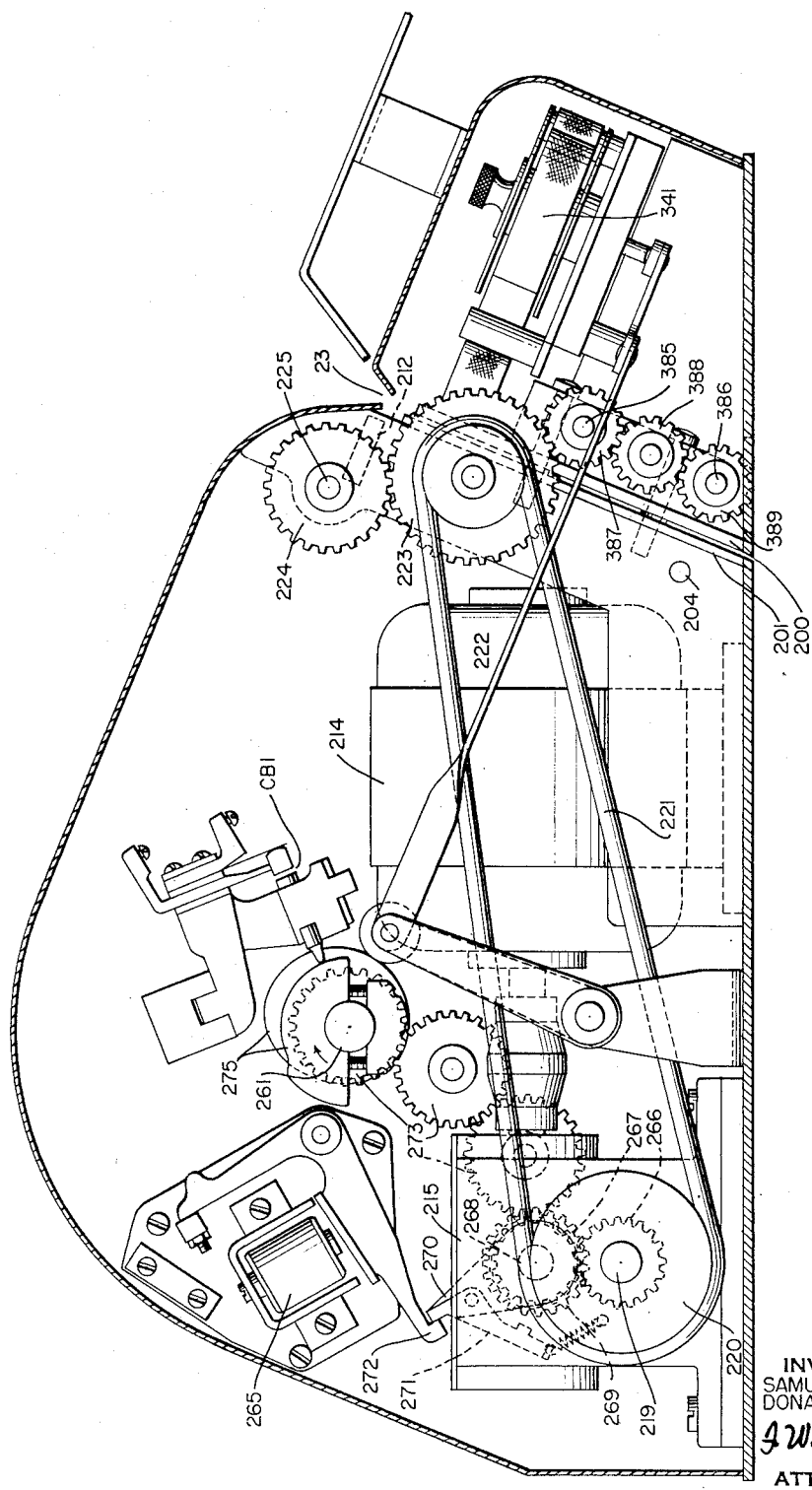

Fig. 9 is an end view taken on the line 9—9 of Fig. 7 showing the left side of the unit.

Fig. 10 is a transverse sectional view taken on the line 10—10 of Fig. 8.

Fig. 11 is a diagram illustrating the 6 position code for digits 0–9.

Fig. 12 is a transverse sectional view taken on the line 12—12 of Fig. 8.

Figure 13:
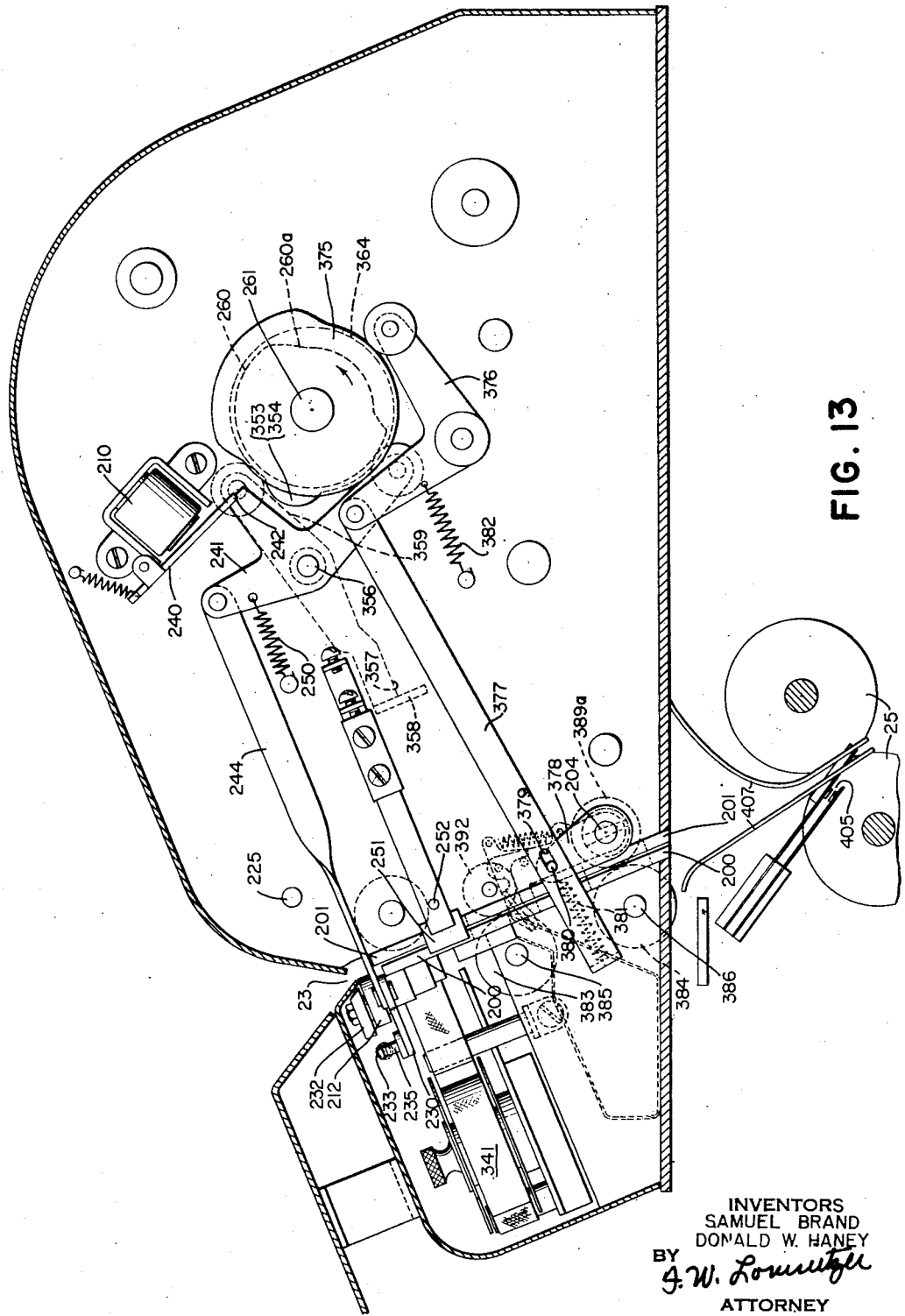

Fig. 13 is an end view of the right side of the unit taken on the line 13—13 of Fig. 8.

Figure 14:
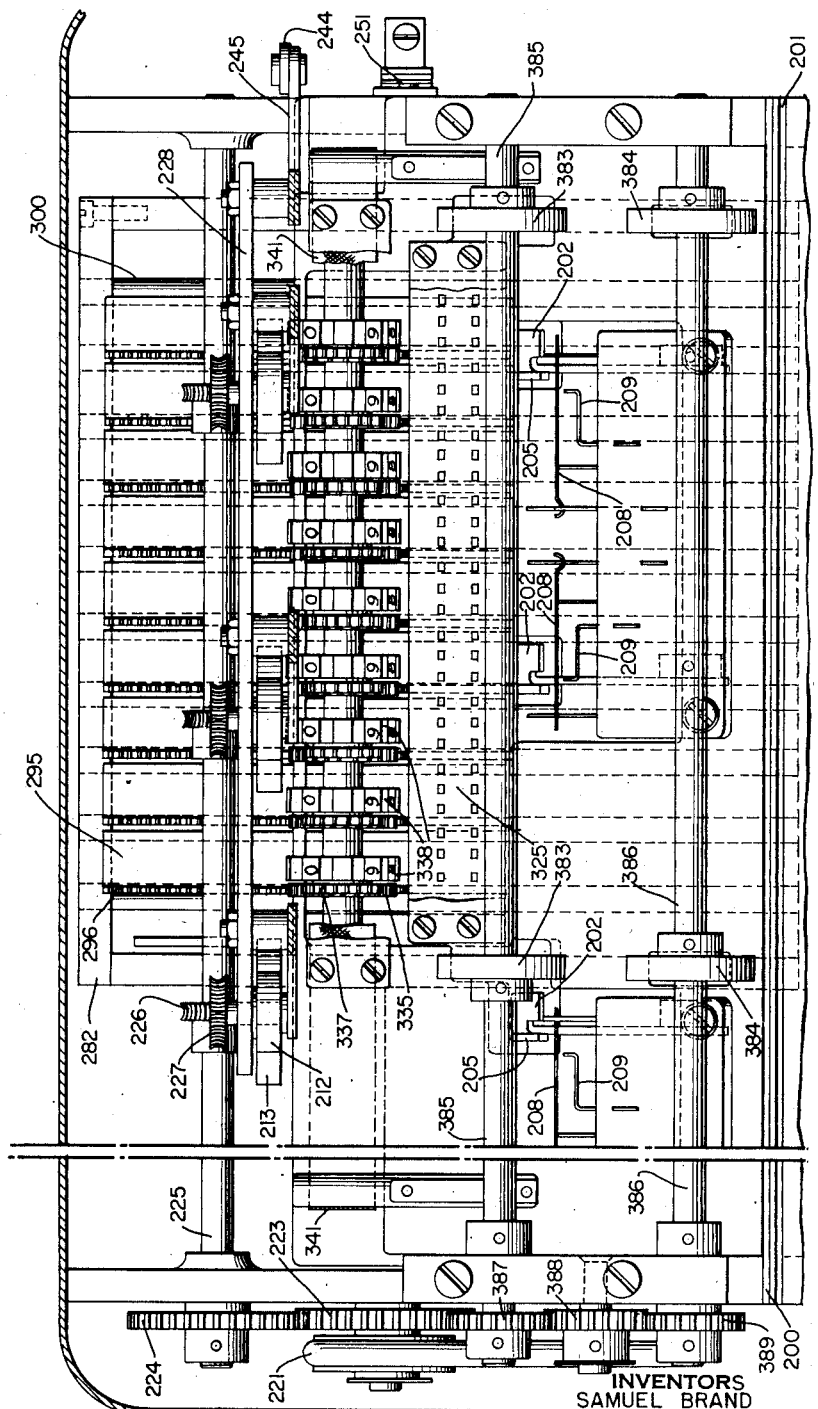

Fig. 14 is a sectional view taken on the line 14—14 of Fig. 10.

Figure 15:
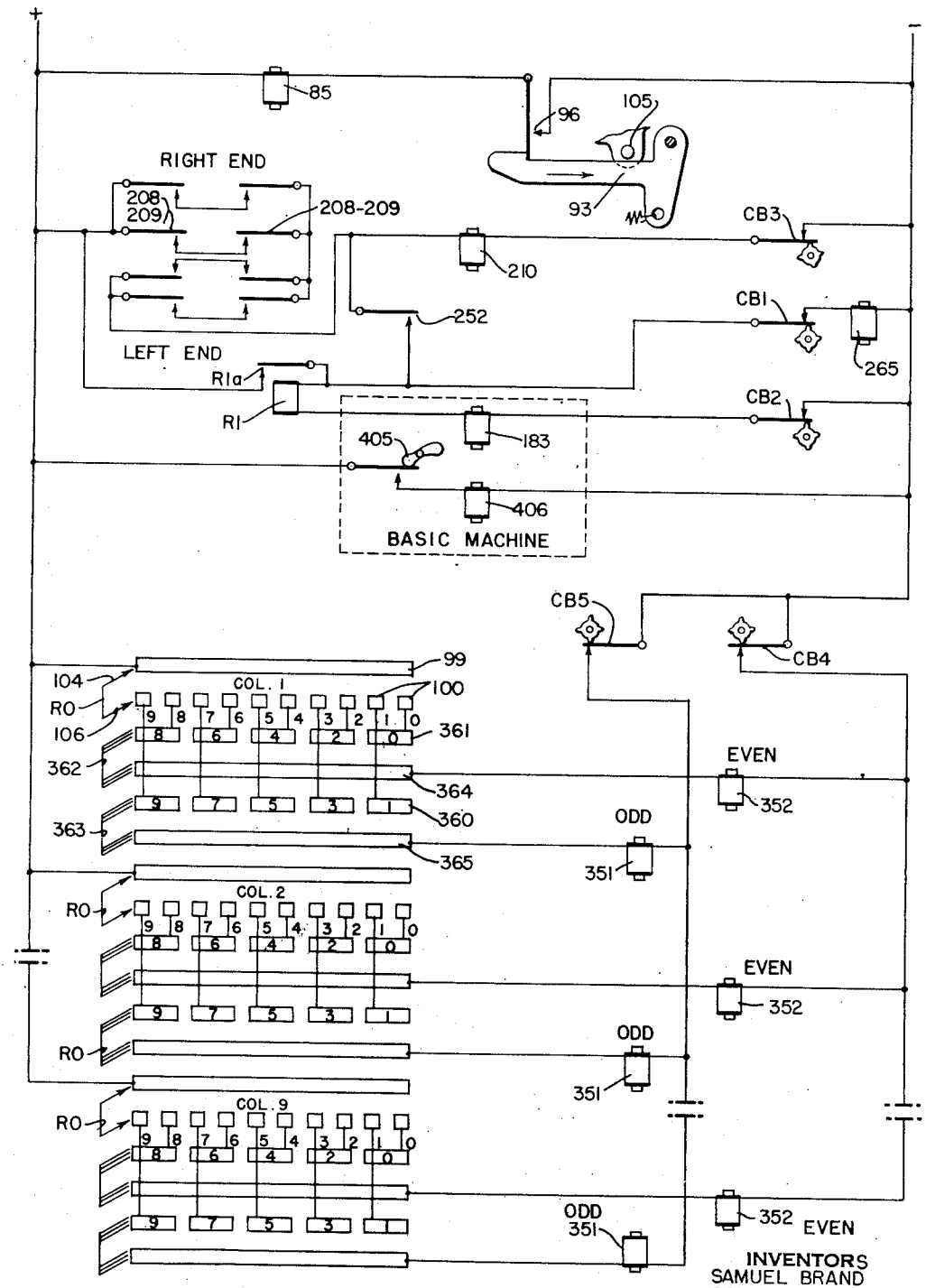

Fig. 15 is a wiring diagram of the electrical instrumentalities.

Fig. 16 is a timing diagram of the machine.

*General description of basic machine*

The present improvements are preferably incorporated in the form of combined sorting and accounting machine shown in the U. S. patents issued to F. L. Fuller and S. Brand, No. 2,142,352, dated January 3, 1939, and No. 2,146,695, issued to S. Brand and J. N. Wheeler, dated February 7, 1939.

The combined sorting and accounting machine is shown in a general manner in Fig. 1 with the improved check printing and punching unit P mounted thereon. Without the latter unit it represents the form of machine which is now used commercially in banks to sort a group of promiscuously arranged checks. The operator is provided with a group of checks which have different classification symbols and in accordance with the classification symbol of a check one of the compartment selector keys 20 on the keyboard is depressed to select an appropriate check receiving compartment 21 carried by a sorting drum 22. Upon the depression of a desired compartment selector key 20 the sorting drum is rotated in either of two directions to select a desired sorting compartment 21 by the shorter of two directions of rotation. By means of the compartment selector keys 20 the extent of rotation and the direction of rotation of drum 22 are predetermined and said keys control an electromagnetically controlled stop mechanism of a well known form which cooperates with the sorting drum 22 to stop the drum at the desired position. All of the means for carrying out the above function are well known and fully described in the above cited patents. The general description given herein is to make it clear that checks printed and punched by the additional unit forming the present invention may also be disposed in sorting compartments preselected by the compartment keys 20.

The function of the machine shown in the aforementioned patents herein is to also effect the entries of the amounts on the checks selectively in a plurality of totalizers and to cause the listing of amounts on the check upon a main control tape and also upon separate compartment tapes which are associated with the plurality of sorting compartments. To provide for the entry and listing of the amounts the machine is provided with ten keys of a keyboard which are initially depressed so as to control the setting on a suitable setup mechanism an amount equal in value to the keys struck. In the present machine such ten keys 60 (Fig. 3) of the keyboard control the differential setting of printing elements and punch selecting elements so that the amount may be both printed and punched upon a check inserted in the chute prior to feeding the check in the preselected compartment. After the amount has been set up on the setup mechanism the operator then inserts the check in the check receiving aperture 23 and instead of depressing a motor release bar 24 (Fig. 3) to cycle the machine the check itself initiates the cyclic operation. A number of functions are then performed among which is the feeding of the printed and punched check by feeding rollers 25 into the selected compartment and also the positioning of the totalizer actuators and printing mechanisms in order that the amounts may be entered in a grand totalizer and selectively into one of a plurality of compartment totalizers, and furthermore one of a plurality of compartment printing mechanisms associated with the compartments will be selected for operation so as to print the amount on the selected compartment tape. A printing mechanism is concomitantly adjusted so as to print the same amount on the control tape.

*Ten-key controlled amount setup mechanism*

The ten-key keyboard mechanism is provided for setting up amounts read by the operator and for causing the amount to be punched and printed on checks before they are sorted. Any suitable ten-key keyboard mechanism may be used and one type that may be used is fully shown in the application of F. J. Furman et al., Serial No. 217,118, filed March 23, 1951, and only that much of its construction and operation that is necessary to understand the present invention will be explained.

During the rotation of the sorting drum to select a compartment in accordance with the compartment selecting designation on the check and prior to the cycling of the machine the amount read on the check is set up by the ten-key keyboard. The purpose of the associated setup mechanism is to cause the punching and printing mechanism to be set in the unit P, after which the cyclic operation of the machine is initiated by the inserted check after it has been punched and printed.

The ten-key keyboard unit has ten numeral keys 60 (Fig. 4) which are arranged in a conventional ten-key keyboard arrangement and upon the upper protruding ends of the slidable key stems 61 there are mounted the key caps which designate the digital value of each key. The key stems slide in a slotted guide plate 62 and at their lower ends they are each articulated by a pin 63 to a hook operating arm 64, all ten of which are pivoted on a rod 65, each arm 64 being urged by an associated spring 66 against a stop bar 67, said spring 66 also normally functioning to return each key after it has been depressed, as well as to return the associated arm 64 against the stop bar 67. Each arm 64 carries a stud 68 projecting against a finger 69 of an associated arm 70 having a hooked end 71. Each arm 70 is pivotally mounted by a stud 72 to the associated stop pin raising arm 73. Each arm 73 is urged by a spring 74 to normal position, shown in Fig. 4 and all of said arms 73, of which there are ten, one for each key 60, are pivoted on a rod 78. It will also be seen that a spring 79 connected between a hole in the pin raising arm 73 and related arm 70 retains the finger extension 69 against the stud 68, as is shown in Fig. 4.

So far it is evident that when a key 60 is depressed by the finger of the operator it will rock hook operating arm 64 counterclockwise against the action of the spring 66, causing stud 68 to act against the finger 69 to rock the arm 70 slightly counterclockwise to bring the hook end 71 underneath a power-operated bail 80. It is evident, therefore, that the only load upon the operator in depressing a key is that required to rock the arm 70 so as to place the hook-shaped end 71 beneath the bail 80, the power required to do so being very slight due to the weak springs 79 and 66. After the hook-shaped end 71 is caught underneath the bail 80 there is a power operation of the bail 80 by electrical power means initiated in operation by the following described mechanism. Bail 80 is secured to a rock shaft 81 and secured to said shaft 81 there is an arm 82 which is articulated by a stud 83 to the core 84 of a power solenoid 85. The bail 80 is normally held in the position shown in Fig. 4 by means of a spring 86 connected to said arm 82.

Extending beneath each of the key stems 61, which are of such shape that they are in a single line at their lower extremities, is a bail 90 which is pivoted upon a rod 91. One arm of said bail 90 is connected by a stud 92 to a contact operating member 93 which is urged by a spring 94 so that its left-hand extension fits in slots 95 of the blades of contacts 96. The spring 94 also retains contact operating member 93 so that its shoulder 97 is immediately adjacent the left-hand contact blade.

Figure 4:
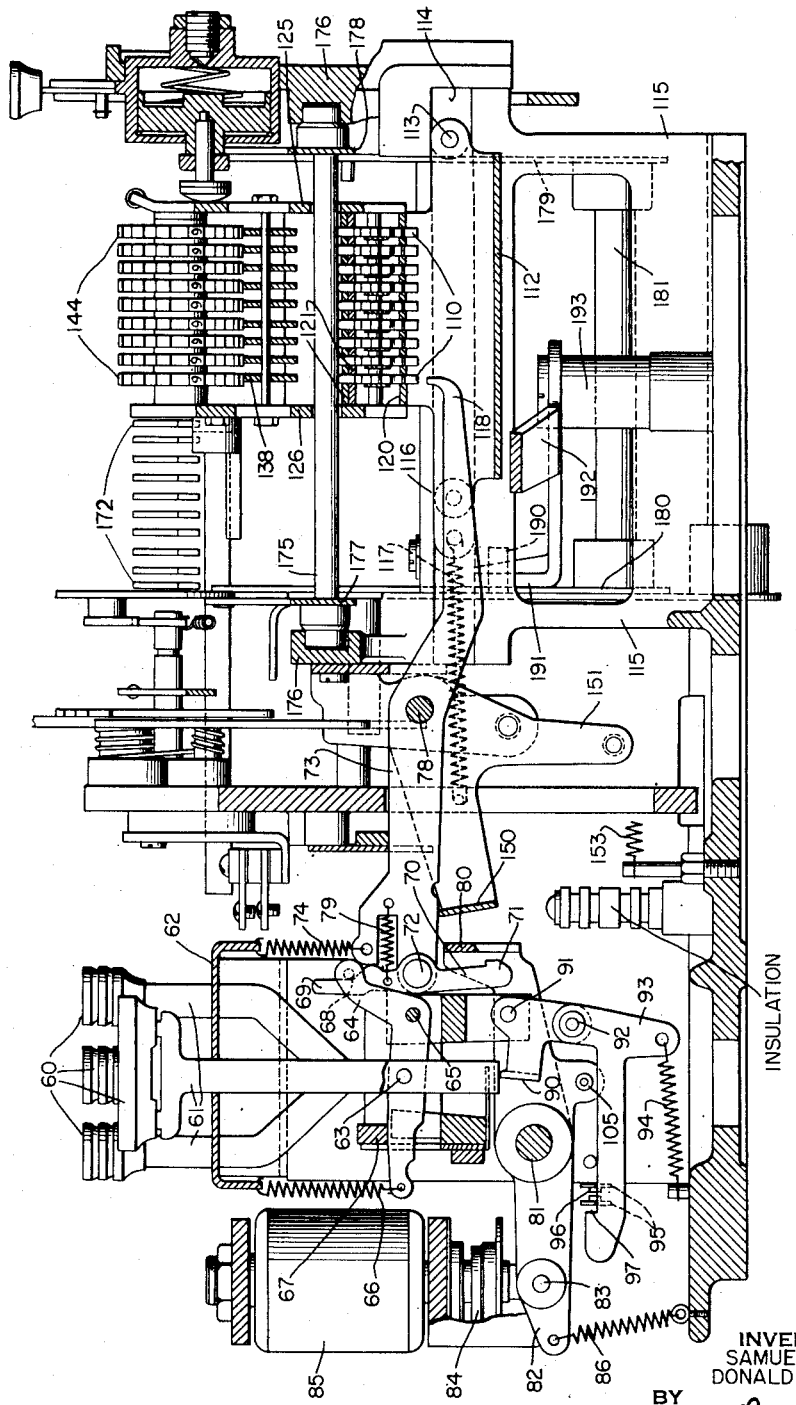
Fig. 4 is a transverse sectional view of the ten-key keyboard mechanism.

When said bail 90 is rocked counterclockwise it will, through its pivot stud 92 move contact operating member 93 slightly to the right, as viewed in Fig. 4 so that shoulder 97 bearing against said left-hand contact blade will close contacts 96. It should be noted that closure of contacts 96 is timed to take place after the hook-shaped end 71 of the arm 70 associated with the depressed key is beneath the bail 80 and also that the additional load placed upon the finger of the operator to close such contacts 96 is not great because of the weak spring 94 and the slight power required to close the contacts 96.

Thereafter, a circuit is completed from the positive line side (Fig. 15), through solenoid 85, contacts 96, to the negative line side to energize said solenoid 85 which thereupon attracts its core 84 (Fig. 4), rocking the bail 80 clockwise and through the hooked arm 70 connecting it with the bail 80 rocking the associated pin setup or raising arm 73 counterclockwise against the action of spring 74 to set up, in a manner to be described, a pin in a pin setup carriage representing the digit of the key depressed. This operation takes place without effecting any further movement of the key since, at this time, the finger extension 69 will merely ride down against the stud 68 without effecting any movement of the rocked arm 64 or the interconnected key stem 61.

Near the end of the solenoid plunger power stroke a stud 105 on an arm of the bail 80 operates against the upper edge of the contact closing member 93, rocking the latter slightly counterclockwise and disengaging shoulder 97 from the left-hand contact blade of contacts 96 so that by their inherent resiliency said contacts 96 again open and deenergize the solenoid 85. The depressed key must be returned to nearly its normal position before spring 94 will rock member 93 so as to re-engage the contacts 96 for another closure thereof. Also the hooked arm 70 is not disengaged from the bail 80 until near the end of the return stroke of the solenoid core 84. Therefore, the depressed key must be returned nearly home before another key can be depressed, or a redepression of the same key can be effected. At this point the rocked arm 64 is released from the well known single key interlocking mechanism so that another key can be depressed.

In the differential mechanism the setup pins or stops 110 are arranged in a transverse series as shown in Fig. 4 in which all pins in each transverse series represent the same digit and in which the pins or stops are also arranged in longitudinal series (Fig. 5) in numerical order 0–8 and all the pins are capable of being selectively set to limit the movements of actuating devices.

Figure 5:
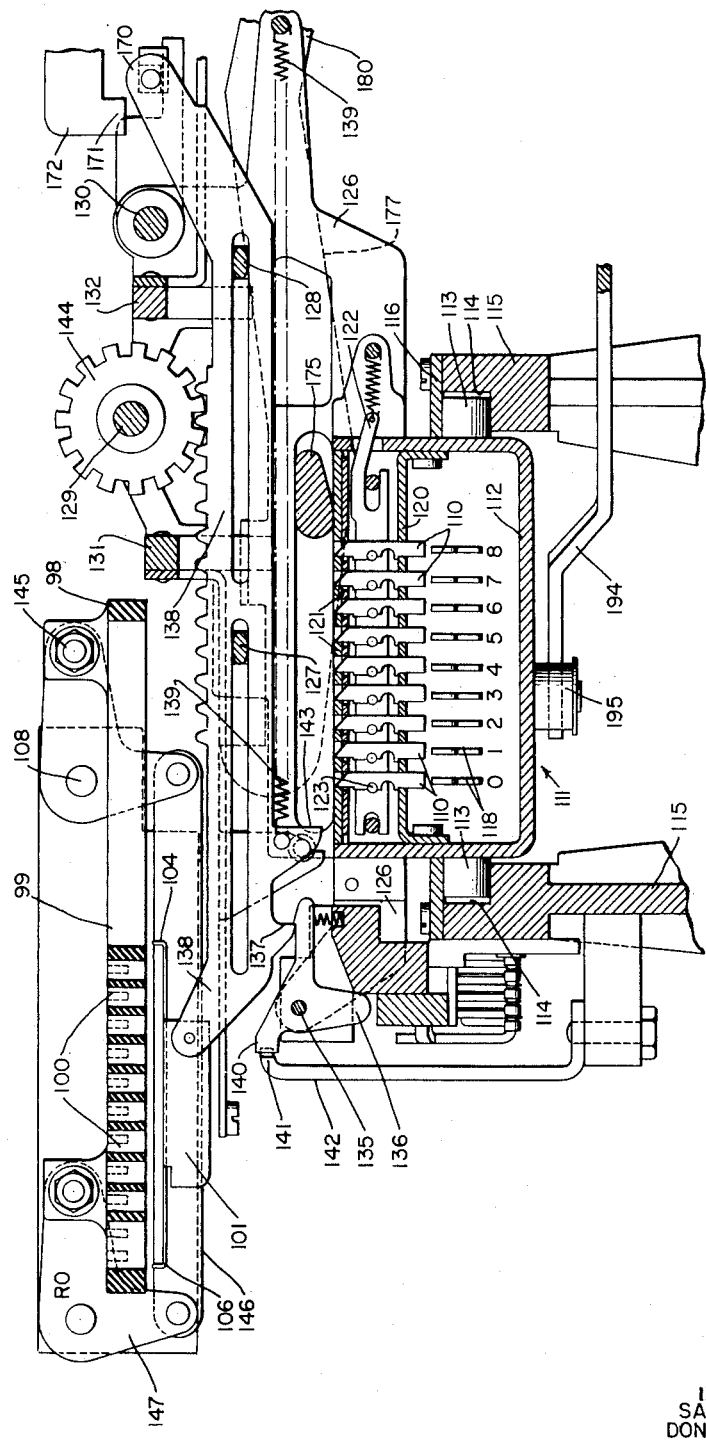
Fig. 5 is a longitudinal sectional view of the ten-key keyboard mechanism showing the electrical readout mechanism for controlling the printing and punching mechanisms.

The pin setup carriage which is designated generally by the reference character 111 (Fig. 5) includes a U-shaped plate 112 carrying rollers 113 which are slidably mounted in tracks 114 (Fig. 4) each formed by a shoulder in castings 115 (Fig. 5) and a cap plate 116 secured thereto. By this means the pin setup carriage is moved step by step as the longitudinal series of stop pins 110 are successively set up to represent the digits of the keys depressed. The carriage is urged to the left as shown in Fig. 4 by means of a spring 117 connected to the carriage, the step-by-step movement being under control of an escapement mechanism to be subsequently described. The several series of longitudinal stop pins 110, of which there are nine longitudinal series for setting up a number having nine denominational orders, are slidably mounted in a bottom guide plate 120 and upper guide plates 121, both of said guide plates 120 and 121 being carried by and mounted within the U-shaped plate 112. As best shown in Figs. 4 and 5 the pin raising levers 73 for keys 0–8 have nine fingers or extensions 118 which project through said pin setup carriage as shown in Fig. 4 so as to raise an associated stop pin 110 corresponding to the digit key 0–8 depressed of the effective longitudinal series. For each longitudinal series of pins 110 there is a spring-urged detent plate 122 carrying pins 123 which engage one or the other of a pair of notches in each stop pin 110 to hold the pins 110 down in normal position, or one in elevated position, as is well known in such detent mechanism.

Secured to the U-shaped frame plate 112 and carried thereby in any suitable manner are two upstanding side plates 125 and 126 (Fig. 4). To side plates 125 and 125 are attached the guide plates 120 and 121, as seen in Fig. 4. Thus, an extension of the pin carriage is provided and the upper portion of said carriage has cross connecting members, such as guide bars 127 and 128 (Fig. 5) on which certain members are slidably mounted, as well as supporting shafts 129 and 130 and cross bars 131 and 132. These cross members provide a rigid frame which is an extension and part of the movable pin carriage.

Pivotally mounted on a rod 135 also carried by side frame members 125, 126 is a series of spring-urged latch members 136, each having a hook normally engaging a shoulder 137 of a series of setup slides 138 slidably mounted in the pin setup carriage by the guide rods 127 and 128. A spring 139 attached to each rack 138 urges the latter to the right to cause the hook of the latch member 136 to normally engage the shoulder 137 of the associated slide 138. Each latch member 136 has an extension 140 adapted as the step of movement of the pin carriage moves the effective longitudinal series of stop pins out of engagement with the extensions 118 after a stop pin in said series has been set up, to engage the cam edge 141 of a stationary cam plate 142 (see also Fig. 3).

Figure 3:
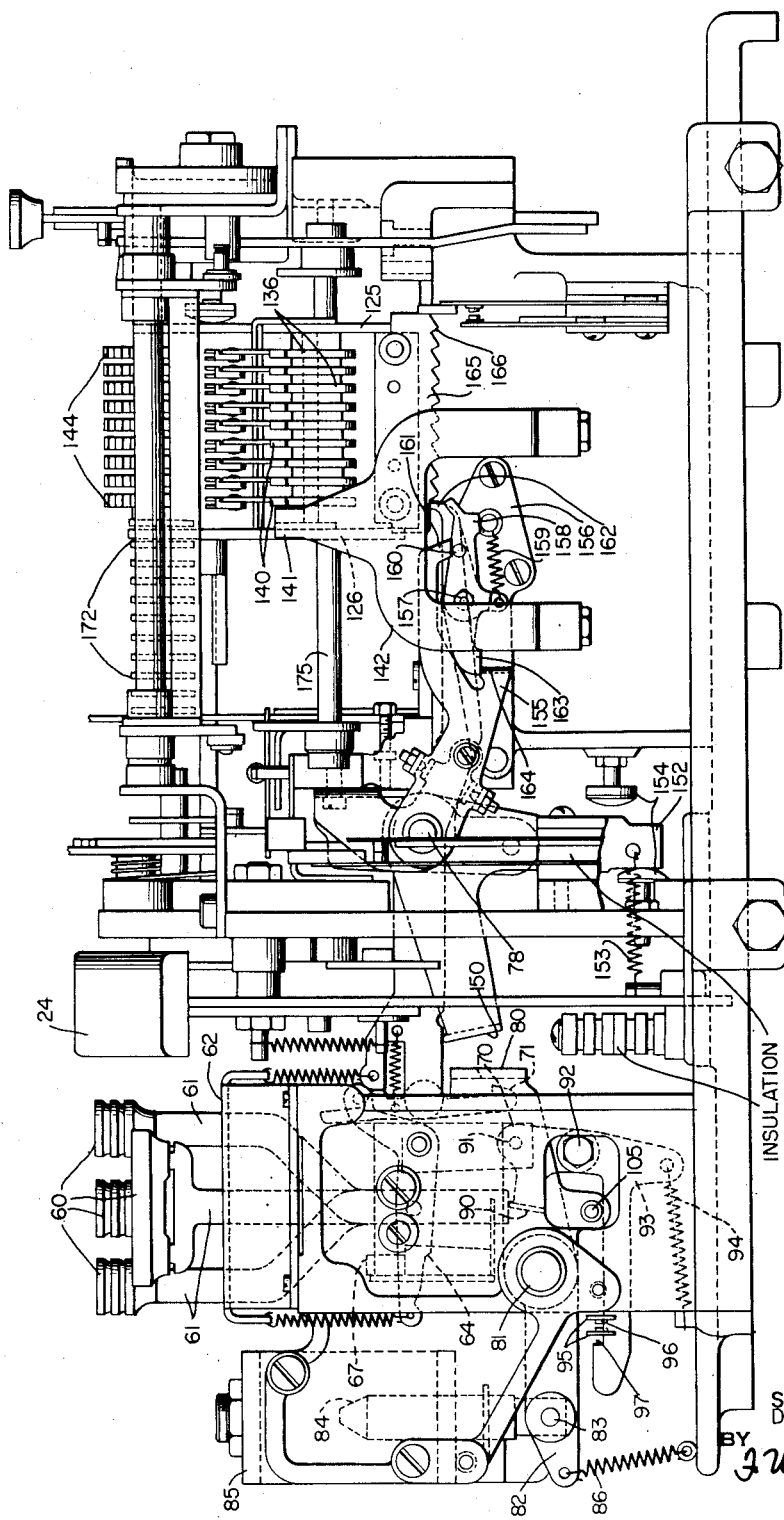
Fig. 3 is a view in front elevation of the ten-key keyboard mechanism.

As is viewed in Fig. 3, if the first or left-hand longitudinal series of pins has been set up to represent the digit of the depressed key a step of movement of the pin carriage will cause the extension 140 of the latch 136 of the associated series to engage the cam edge 141 which cam edge will cause the rocking of the latch member 136 clockwise (Fig. 5) to disengage it from the setup slide 138. The spring 139 attached to said slide 138 will now move it to the right until a depending extension 143 thereof strikes the elevated pin stop 110. It is, of course, understood that the release of the slide 138 occurs after the pin 110 has been raised and held elevated by the detent plate 122. Each slide 138 has rack teeth which mesh with a gear 144 having on the periphery numeral indicia which are visible through a slot in the cabinet so that the numerical value of the previously pressed key is exhibited. As the carriage moves step by step the indicia are brought into view, to represent a number which has been set up.

The escapement mechanism is provided for obtaining the step-by-step movement of the pin carriage to the left, as viewed in Fig. 3, as the several longitudinal series of pins 110 are set up by the successive depression of the keys. Underlying the ten pin raising arms 73 for keys 0–9 is a bail 150 secured to the rock shaft 78, said bail 150 having, as shown in Figs. 3 and 4, depending arms 151 and 152, said arm 152 having connected thereto a spring 153 which is adapted to return the bail to normal position after having been rocked by the arms 73. Arm 152 moves back and forth between a pair of adjustable stops 154 (Fig. 3) which limit the extent of rocking of the shaft 78 to which said bail 150 is secured and also an escapement operating arm 155 which is secured to the shaft 78, as best shown in Fig. 3. Mounted on a fixed bracket 156 by a stud 157 on said bracket is an escapement dog 158 which is urged by its spring 159 so that a stud 160 carried thereby normally abuts a finger 161 of the escapement operating arm 155. The locking dog 162 is also pivoted on the stud 157 and rocked by a spring similar to spring 159 so that its tail 163 overlies a lug 164 offset from the escapement operating arm 155. An escapement rack 165 is carried by the side plates 125 and 126, said rack having escapement teeth 166 and the escapement rack 165 is of sufficient thickness so that the teeth 166 cooperate with both the locking dog 162 and the escapement dog 158.

When the pin setup carriage is at its normal position having previously been returned to such position, the locking dog 162 engages the extreme left-hand tooth of the escapement rack 165, as shown in Fig. 3, to hold the pin carriage at normal. When bail 150 is rocked downwardly through the first power operation of the selected pin raising arm 73 shaft 78 will be rocked counterclockwise and rock the escapement operating arm 155 in the same direction and by the offset lug 164 in cooperation with the tail extension 163 of the locking dog 162 the latter will be rocked clockwise against the action of its spring. In the meantime, however, spring 159 causes the stud 160 to follow the finger 161, allowing escapement dog 158 to be rocked upwardly as the locking dog 162 moves out of engagement with said first tooth, the pin carriage is now moved by its spring 117 (Fig. 4) a slight amount but not a full step of movement. When bail 150 is returned by its spring 153 escapement operating arm 155 will now be rocked clockwise and finger 161 acting on pin 160 will rock escapement dog 158 out of engagement with said first tooth. In the meantime, however, locking dog 162, being rocked upwardly to cause an ultimate engagement with the second tooth and when the escapement dog 158 fully clears said first tooth the spring 117 which moves the pin setup carriage will move it the remainder of the distance determined by engagement of locking dog 162 with the second tooth to thereby complete the first step of movement of the pin carriage. This form of an escapement mechanism is well known and its operation is only generally described herein, it being noted, however, that the escapement operation is not performed by the power applied to the keys but is operated by power derived from the solenoid 85 which, it will be recalled, is the instrumentality for rocking the selected pin raising arms 73 and bail 150. Hence, the manual power required by the keys in the previous pin carriage setup mechanisms for operating the escapement is avoided, and by causing the power operation of the escapement mechanism the load upon the fingers of the operator is further lessened, which aids in a lightened key load and faster key operations.

It is also explained that the 9 key does not cause the setting up of any of the stop pins 110 because there is no pin raising extension 118 for the 9 key and no stop pin 110. Only the digit keys 0–8 inclusive raise 0–8 stop pins 110. The arm 73 related to the 9 key, however, does operate the bail 150 to operate the escapement mechanism, allowing, as will be presently described, for a 9-digit setup a 9 step of movement of the pin setup carriage.

Referring to Fig. 5 it will be recalled that upon setting up any of the stop pins 110 for the digits 0–8 setup slides 138 take a commensurate movement. As the carriage moves step by step the setup slides 138 are also moved step by step.

It will be observed that whenever a 9 key is operated, although no stop pin 110 is set up, the latch member 136 associated with the longitudinal series of pins 110 now effective is, nevertheless, rocked to unlatch the associated setup slide 138 which will be moved to a 9 position by its spring 139 until its extension 143 strikes a rod 175. This rod is stationary during the operation of the keys.

After the setup slides 138 have received their differential movements and the latched pins 110 have functioned as stops for setup slides 138, said pins 110 are depressed to normal position by the aforementioned rod 175. The pin carriage is restored at the same time as will be described later.

The rod 175 passes through side frames 125 and 126 (see Fig. 4) and carries rollers at its extremities which roll in guide slots formed in castings 176. The rod 175 is connected by a pair of links 177 and 178 (Figs. 4 and 6) to respective rock arms 180 and 179, both being pivoted on a rod 181 (Fig. 4). The arm 179 (Fig. 6) is, as is fully described in the aforementioned application, rocked by a cam connected to the main drive shaft of the machine. When said shaft is turned one revolution during the cyclic operation of the machine, the cam will, through the linkage just described and during the last portion of the cycle, cause rod 175 to be moved to the left to engage the upper bevel portions of the raised pins 110, thus depressing them to normal position and also engaging the shoulders 143 of each of the unlatched setup slides 138 so that the latter are moved back by the rod 175 to normal position where they are relatched by the latch members 136.

For returning the pin setup carriage to home position where it is held in such position by the escapement mechanism, one arm 180 carries a stud 190 (Figs. 4 and 6) which engages an upward extension 191 of a bell crank 192 pivoted on a stud 193. The arm 194 (Fig. 6) of said bell crank engages a pin 195 carried by the U-shaped plate 112 and as the bell crank is rocked the pin carriage will be returned to normal at the end of the cycle and held at such normal position as shown in Fig. 3 by the locking dog 162, it being noted that during such return locking dog 162 merely ratchets over the teeth of the escapement rack 165. During the return of the carriage the carriage return spring 117 (Fig. 4) will also be retensioned as is evident.

*Differentially operated operating mechanism in basic machine controlled by the ten-key setup mechanism for effecting entries in accumulators, setting printing mechanisms, etc.*

The basic machine includes and the present machine may also include a differential mechanism which is controlled by the ten-key keyboard for effecting entries in a selected totalizer, set up different printing mechanisms, etc. This mechanism is fully shown and described in the aforementioned patent to F. L. Fuller and S. Brand, No. 2,142,352, but in order to have a general understanding how this is effected it is explained that as the setup slides 138 are released for differentially positioning to the right, and also are moved laterally step by step to the left the square studs 170 carried by said slides 138 come into the plane of the hooks 171 of control slides 172. After the desired digits have been set up, one or more setup slides 138 will be positioned at the left by the carriage for securing this relationship and the square studs 170 will be at differential distances to the right from the hooks 171 of the slides they are to control. The hooks 171 are normally above the studs 170 and as is well known such slides 172 are moved downwardly at their hook portions so as to be stopped by the related stud 170 when each slide 172 is moved to the right during the cyclic operation of the machine. The control slides 172 thus move to the right until they are arrested by the studs 170 and the differential positions of the slides 172 are utilized to control the differential movement of totalizer actuators, and the printing elements of the main control tape and the compartment printers. At the end of the cyclic operation of the machine the slides 172 are restored and elevated to the position shown in Fig. 5.

*Keyboard controlled electrical digit readout RO1*

In addition to the digit setup by wheels 144 (Fig. 5) which afford the operator the opportunity to visually determine the digits which have been set up by the ten-key keyboard, there is provided a digit readout RO (Figs. 5 and 6) which is electrical in arrangement and is set up under control of the ten-key keyboard to determine the amount to be punched and printed on the check.

Figure 6:
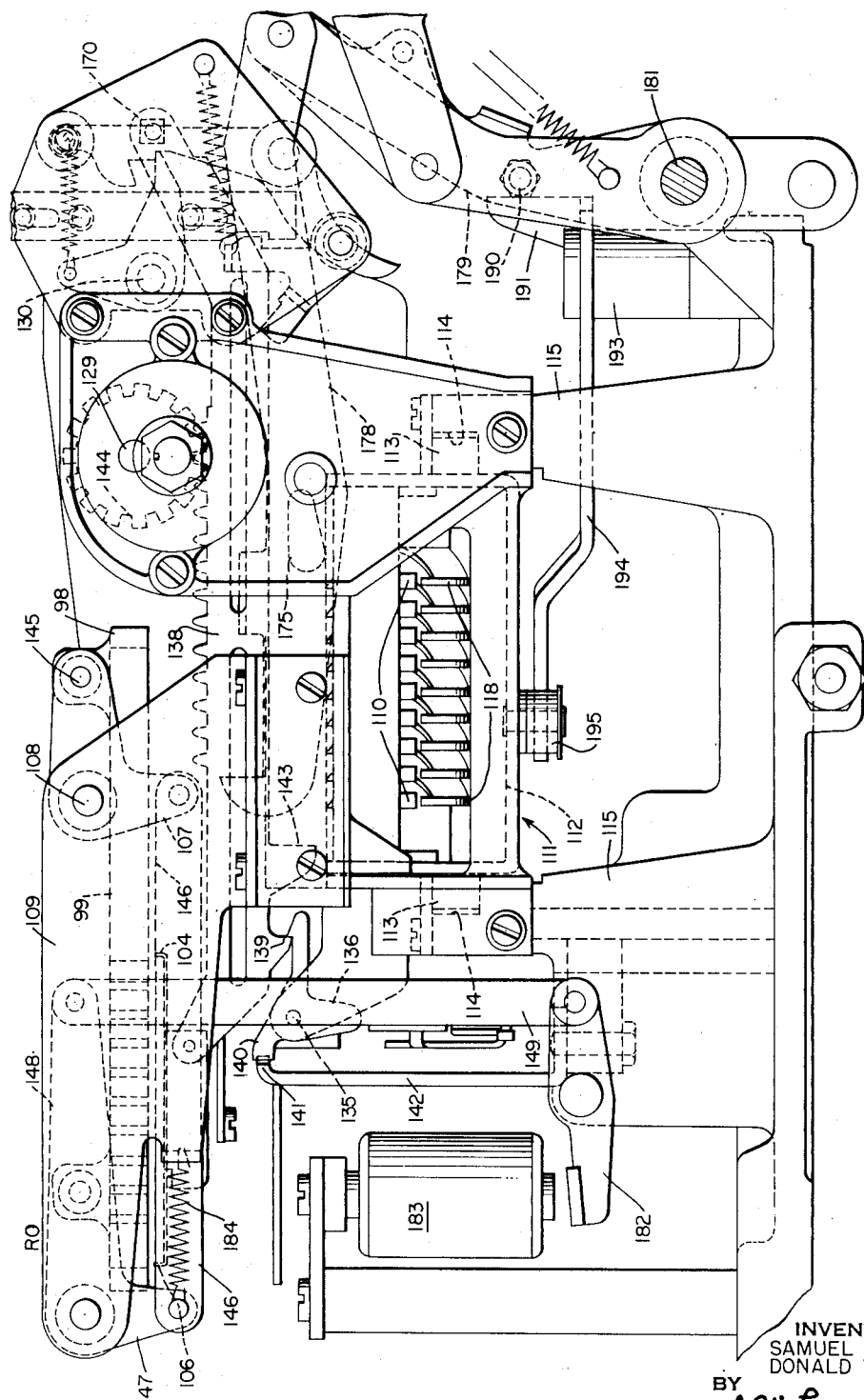
Fig. 6 is a view of the right side of the ten-key keyboard mechanism.

The electrical readout unit RO (Figs. 5 and 6) consists of a support plate 98 of insulating material having embedded therein for each of the nine columns a column contact strip 99 and the ten digital contact points 100 (see also Fig. 15). There is a digital contact point 100 for each of the digits 0–9. Each setup slide 138, as best shown in Figs. 5 and 6, carries an insulated plate 101 having the integral column strip contact finger 104 and digit contact finger 106 (see Fig. 15). Obviously, according to the digital position 0–9 of each setup slide 138 the associated plate 101 will be in such position that finger 106 will make contact with one of the 0–9 digital contact points 100 and its other finger 104 will be in position to make contact with the column strip 99. If a setup slide 138 is not moved plate 101 is not moved and its fingers 104 and 106 will remain in contact with the insulation of plate 98. Since setup slides 138 and plates 101 with the contact fingers 104 and 106 carried thereby move step by step to the left as the successive key strokes are made, each key stroke increases the number of columns representing some digital value 0–9. In amount entering operations all unkeyed columns remain at blank positions so that nothing is punched or printed for these unkeyed columns.

The support plate 98 and contact strips 99 and contact points 100 carried thereby are normally positioned above the contact fingers 104 and 106, as shown in Fig. 5, in order that the setup slides 138 may be freely moved to differential positions and laterally step by step without adding resistance thereto which would happen if the contact fingers 104 and 106 directly wiped under the contact elements 99 and 100. To this end the contact plate 98 is supported at the right side (Fig. 6) by bell cranks 107 which are pivoted on studs 108 carried by an upstanding frame plate 109. Said bell cranks 107 also have holes receiving pins 145 carried by brackets attached to the right side of the support plate 98. The vertical arms of the bell cranks 107 are interconnected by links 146 to bell cranks 147. Thus, the left side of the plate is supported by similar supporting means, as shown in Fig. 6, the associated bell cranks 147 having pivotal connections to the left side of plate 98. One bell crank 147 thereof has an extension 148 to which a link 149 is secured, said link being connected to an extension of an armature 182 of a magnet 183. Said magnet 183 when energized in a manner to be explained rocks the armature 182 and through link 149 rocks the four bell cranks 147 and 107 supporting the plate 98 to lower said plate 98 enabling contact fingers 104 and 106 to make contact with the column strip 99 and digital points 100. As will be presently described in connection with the wiring diagram an impulse is transmitted at the proper time to this magnet so that the settings of RO may be used as a control for the punching and printing mechanism. When the magnet is deenergized the plate 93 is returned to normal by a suitable spring 184.

*Operation of aligning contact means*

So far it has been stated that after the desired compartment has been selected by the compartment selector keys 20 and the amount which has been read thereon is set up in the ten-key mechanism by the operation of keys 60 corresponding to the amount on the check, the operator then inserts the check into the unit P now to be described so as to cause the automatic perforating of the check and printing of the amount thereon and then the feeding of said check to the selected sorting compartment. The operator places the check in a slot 23 (Figs. 1 and 13) between guide plates 200 and 201 (Fig. 12) until the lower edges abut ledges 202 (Fig. 10) formed on a respective arm 203 pivoted on a roller drive shaft 204. Preceding engagement with the edge 202 the lower edge of the check actuates a contact operating member 205 pivoted at 206 on the respective arm 203 and urged by a spring 207 to the position shown in Fig. 10. The contact operating lever 205 is made of an insulating material such as plastic and spring 207 is a light spring so as to enable the easy rocking of the contact operating lever 205 so as to project a wire 208 against a contact terminal 209 so as to close contacts 208—209 (see Fig. 14). The arrangement shown in Fig. 10 is quadruplicated and connected in a series parallel, as shown in Fig. 15 so that the bottom edge of the inserted check at the left and right ends may close one pair of such contacts 208—209 in shunt. Any two pairs of contacts in series complete a circuit to a lateral feed magnet 210 when cam contacts CB3 close. The contacts are closed by the right and left ends only when the inserted check is properly inserted in the chute at which time the bottom edge abuts the ledges 202 of the arms 203.

*Lateral check feed*

The lateral check feed rollers are best shown in Figs. 7 and 8 and comprise four pairs 212, 213 which are normally separated to allow the free insertion of a check in chute 23. The rollers 213 are constantly driven by the following driving mechanism. Referring to Fig. 9, a motor 214 is the prime mover of the P unit now being described and the armature shaft thereof drives a speed reduction mechanism 215. The reduced drive shaft 219 has secured thereto a pulley 220. The latter through a belt 221 rotates a pulley on shaft 222. The latter carries a gear 223 in mesh with a gear 224 secured to a transverse drive shaft 225. The latter carries worm wheels 226, each of which meshes with a respective gear 227 secured to a respective stub shaft to which the related roller 213 is secured. A fixed supporting bar 228 carries the rollers 213, related stub shaft, and worm gear 227. In this manner the feed rollers 213 constantly rotate in a direction which would feed the check to the right when the pairs of rollers 212 and 213 are in cooperation with each other. Each of the rollers 212 is carried by a bell crank 230 pivoted at 231 to a bar 232. Each bell crank 230 is urged by a spring 233 connected to a stud 234 of the associated bell crank 230 and a stud 235 carried by a link 236 so as to normally attempt to contact its associated roller 213 but is prevented from so doing by the contact of stud 234 with the termination of a slot 237 in the link 236. However, when said link 236 is moved to the left by means now to be described it will enable spring 233 to rock the related bell crank 230 so as to cause feed roll 212 to contact with the associated roller 213. Contact of the four pairs of rollers to thus frictionally engage the check inserted therebetween is effected by moving link 236 to the left by means now to be described.

Referring to Fig. 13 the armature 240 of the lateral check feeding magnet 210 normally latches a double follower arm 241 by engaging a shoulder 242 on an extension thereof. The upper arm 241 has a link connection 244 which is articulated to a bell crank 245 (Fig. 8) pivoted on a fixed stud 246 and which has a pivot connection 248 to the aforesaid link 236. When said follower arm 241 is unlatched it is rocked by a spring 250 (Fig. 13) so that through link 244 and bell crank 245 the link 236 is moved to the left, allowing each of the springs 233 to rock the respective bell cranks 230 and rollers 212 into engagement with the constantly rotating feed rollers 213. This will feed the check to the right until its right edge makes contact with an insulating contact block 251 (Fig. 8) to close contacts 252. The check comes to the right endwise by an abutment 253 (Fig. 8), the sets of feeding rollers 213, 212 frictionally urging and retaining the check in such position. After the printing and punching operation a high portion 260a of a cam 260 secured to a drive shaft 261 engages the follower roller of double arm 241, thereby separating the sets of feeding rollers 213 and 212 after enabling the armature 240 of magnet 210 to relatch the double arm 241 to thus retain the sets of rollers separated. In the open position of the feeding rollers 213 and 212 the punched check is fed downwardly by means to be subsequently described into the selected sorting compartment.

*Main drive clutch of P unit*

Referring now to Fig. 15, it will be seen that when all pairs of contacts 208—209 are closed a circuit is completed through such contacts, start contacts 252, cam contacts CB1 now closed, and a clutch magnet 265. A circuit is also completed through R1 relay, magnet 183, CB2 contacts. Even if contacts 252 open, magnet 183 is held energized by CB2 contacts, and R1 relay contacts, until CB2 open. Referring now to Fig. 9, it will be seen that the speed reduction shaft 219 has affixed thereto a gear 266 meshing with a ratchet wheel or clutch gear 267 and said clutch gear constantly rotates on a shaft 268. Loosely mounted on said shaft 268 is a gear 269 to which is affixed an arm 270 upon which is pivoted a clutch pawl 271 which is normally latched in such position that it cannot engage the clutch gear 267 due to a clutch arm 272 which is part of the armature of clutch magnet 265. The above refers to a well known form of one-revolution clutch which, upon energization of clutch magnet 265 enables clutch pawl 271 to engage a tooth of the constantly rotating clutch gear 267 to thereby rotate said arm 270 and the affixed gear 269 one revolution in a counterclockwise direction. Gear 269 drives shaft 261 through a series of gears 273, thereby driving shaft 261 one revolution for each operation of the unit. Said shaft carries the aforementioned cam 260 (Fig. 13) as well as other operating cams which will be referred to and described as the specification progresses. In addition shaft 261 also carries a series of cams 275 (Fig. 9) which open and close cam contacts designated CB1, CB2 and CB3 in the wiring diagram of Fig. 15. The time of opening and closure of such contacts is shown in the timing diagram of Fig. 16.

Referring now to Fig. 15 when contacts 252 close a circuit is also extended through the R1 relay, the readout control magnet 183 and CB2 contacts which are now closed. Said magnet, referring to Fig. 6, causes the readout strip to be moved downwardly by means previously described so that the differentially positioned contacts 106 may be engaged therewith for the purpose of controlling the punch selectors and differentially positioning the type wheels.

*Setting of printing and punching mechanisms*

Numerals 280 (Fig. 10) and 281 (Fig. 12) represent side frame plates which are interconnected at the top by a cross plate 282 and at the bottom by a cross plate 283 which thus forms a rigid framework. Secured to a rock shaft 284 is an arm 285 (Fig. 12) connected to the side frame plate 281 by a pin 286 and connected to a rock shaft 287 is an upstanding arm 288 (Fig. 12) likewise having a pin connection 289 to the same side frame plate 281. At the other side of the unit secured to shaft 284 is an arm 290 (Fig. 8) likewise having a pin connection 291 with the side frame plate 280. Now referring to Fig. 10 the shaft 287 has an upstanding arm 292 having a pin connection 293 to the side frame plate 280. It will be seen, therefore, that the framework is independently carried by pairs f arms at each side so that said frame may be normally retained in the position shown by means of a spring 294 (Fig. 12) secured to the arm 285 but said frame may be moved to the left as viewed in Figs. 10 and 12, slightly to effect the printing and punching of the inserted check.

There are nine orders for printing and punching and accordingly there are nine selectors which receive differential positions to select punches to be operated and position the printing wheels. To this end there are provided nine slides 295 having rack teeth 296 and a right angle portion 297 which is perforated in accordance with a code to select punches and ratchet teeth 298 and 299 which enable the stopping of the slides 295 at different digit positions.

As best shown in Fig. 8 each of the slides 295 is notched on the sides so as to receive a pair of guide rods 300. Said guide rods are carried by the cross plates 282 and 283 and with this construction the slides 295 are suitably guided for movement and are kept from turning in their up-and-down movement by the guide rods 300.

Secured to a rock shaft 305 (Fig. 12) are follower arms 306 and 307 (Figs. 10 and 12), the free ends of which carry links 308 which carry a transverse bar 309 which is guided in its up-and-down movement by the rods 300 and upon which rests the nine slides 295. Each of the arms 306 and 307 carries rollers 310 cooperating with respective cams 311 and 312 secured to the main drive shaft 261. Dependently hung from a cross rod 315 are arms 316 upon which are pivoted arms 317 which have a pin connection 318 to the top of the respective slide. A spring 319 attached to an extension of each arm 317 normally urges the respective slide 295 downwardly so as to follow the downward movement of the supporting bar 309.

Cams 311 and 312 have such formation (see Fig. 16) that they cause the support bar 309 to be moved downwardly, enabling the slides 295 to follow along until each slide is stopped in its downward movement by means of pawls 353 or 354 engaging one of the notches 298 or 299. When each slide is so stopped the bar 309 will continue its downward travel and after the printing and punching operation the support bar 309 is restored, returning the slides 295 to their normal positions.

Each slide 295, as has been described, is provided with a right angle formed code plate 297 which is perforated according to a code so as to cause the actuation of selected punch pins 322. Punching of holes to represent the digits 0–9 is preferably formed in accordance with a 6-unit code. It will be noted that the holes appear singly or in combination for each of the digits as shown in Fig. 11. To conform to the 6-unit code, each punch slide 295 is adapted to cause the selective actuation of six punches 322 of which for each slide there are three columns of two each. Accordingly, each code plate 295 is adapted to have holes 323 or integral portions 324 (Fig. 10) formed therein so that only selected punch pins 322 will be actuated by the integral portions 324. The punch pins 322 are slidably mounted in a stationary cross support bar 325 and are operated against the compression of springs 326 and project through the paper check into a die 327, said die having a slot 329 registering with a chip receiver 328.

An extension of arm 285 carries a follower roller cooperating with a cam 330 (Fig. 12) secured to the main drive shaft 261, which cam is of such formation that when the slides have been differentially positioned in a manner now to be described the slight lateral movement of the framework will cause the code plate 297 of each slide to actuate selected punch pins 322 so as to perforate the check as shown in Fig. 2 to represent the amount setup on the ten-key keyboard.

It is also desirable to print the digits upon the check over the perforations as shown in Fig. 2 to show an interpretation of the perforations and to facilitate knowledge of the amount represented by the perforations. To this end rack teeth 296 of each slide 295 meshes with gear 335 (Fig. 10) rotatably mounted on a shaft 336 and which meshes with gear 337 attached to which is a print wheel 338. The series of gears 337 and print wheels 338 are carried by a shaft 339, and shaft 336 and shaft 339 are carried by the side frame plates 280 and 281 and thus the differentially rotated wheels partake of a lateral leftwise (Fig. 10) movement and in such movement the selected type of the printing wheels 338 are impressed against a platen 340. A suitable inking ribbon 341 is provided and since the check is interposed between the inking ribbon 341 and the selected type of print wheel 338, an inked impression will be made on the check as shown in Fig. 2. It should be noted that for unused orders the associated slides 295 will have a complete downward travel so that print wheels 338 will come to a blank or non-printing position, and the code plate 297 is in such position that no holes will be made on the check in such orders. However, for orders in which digits 0–9 are set up on the ten-key keyboard the 0–9 digits are both punched and printed on the check.

A U-shaped bar 350 (Fig. 10) is mounted between the side frame plates 280 and 281 and carried thereby are nine pairs of latch magnets, of which, in each order 351 represents the odd digit magnet and 352 the even digit magnet. That is to say, when a contact finger 106 in each order is on the 1, 3, 5, 7 and 9 contact points 100, magnet 351 will be energized and when it is on the even points 0, 2, 4, 6 and 8 contact points 100 magnet 352 will be energized. The armature of magnet 351 is adapted to unlatch its respective pawl 353 whereas the magnet 352 through its armature unlatches its respective pawl 354 and as is shown in Fig. 8 two pawls 353, 354 for each order are in different planes so as to engage the associated rack teeth 298 or 299, and all pawls being pivoted on a shaft 349 carried by side frame plates 280, 281. The rack teeth in each slide 295 are in two different planes and even rack teeth 0, 2, 4, 6 and 8 are two steps apart and the odd rack teeth 1, 3, 5, 7 and 9 are each one step above the respective lower tooth 0, 2, 4, 6 and 8. Each pawl 353 or 354 when unlatched is moved by its compression spring 355 to engage a particular tooth of the related series of notches 298 or 299 of the descending slide 295, depending upon the time of energization of the magnet 351 or 352. If so desired, a single magnet 351 or 352, a single unlatching pawl, and a single series of notches on the slide 295 may be provided as is well known. However, the present construction is preferable since it shortens the length of each slide 295 and its excursion to substantially half the amount. Furthermore, the use of two sets of interspersed notches and two pawls provides much better timing conditions for the engagement of a pawl in a notch. With the arrangement having a single pawl and single set of notches the pawl should operate in about ½ cycle point (i. e. ½ the time between adjacent notches) leaving ½ cycle point as a factor of safety. With the indicated arrangement nearly a full cycle point is available for activating the pawl and an additional cycle point for safety.

From the wiring diagram of Fig. 15, it will be seen for each order that the odd contact points 100 designated 1, 3, 5, 7 and 9 are connected to contact points 360 of an emitter and the even contact points 0, 2, 4, 6 and 8 are connected to contact points 361 of the emitter for the same order. Said emitter for each order consists of two brushes 362 and 363, the arms of which are driven by shaft 268 so that brush 362 wipes over a related common contact strip 364 and contact points 361, and the brush 363 over the associated points 360 and contact strip 365. The common contact strip 364 of each emitter is connected by a wire to the associated even magnet 352, whereas the contact strip 365 is wired to the odd magnet 351. The circuit is completed for all the even magnets 352 through circuit breaker cam contacts CB4 whereas for all odd magnets 351 it is completed through circuit breaker cam contacts CB5. Circuit breaker contacts CB4 and CB5 just described are common to the nine orders. The arms carrying the brushes 362 and 363 are secured to the shaft 268 so as to produce even and odd impulses having the impulse timing shown in the timing diagram of Fig. 16 which also shows the timing of the circuit breaker contacts CB4 and CB5 to produce even and odd impulses to energize odd magnets 351 and even magnets 352, to thereby stop slides 295 at the proper time.

Recapitulating, the various slides 295 moved downwardly under control of the support bar 309 until such time that the odd magnet 351 or even magnet 352 is energized, depending upon the position of the contact point 106 on the even or odd contact points 100 of the associated order. The time that the magnets 351 or 352 are energized by CB4, CB5 and even and odd emitters 362, 363 determine the particular notch 298 or 299 which will be engaged by pawl 353 or 354, which when released engages the desired even or odd notch to terminate the downward movement of the slide 295. The bar 309 continues to its lowermost position and upon its return it will pick up the slides 295, depending upon their previously adjusted position, thereby rocking each pawl 353 or 354 counterclockwise to enable it to be relatched by the associated armature.

*Positive restoration of pawls 353, 354*

It is preferable to positively rock pawls 353 and 354 so as to be relatched by the armatures of magnets 351, 352 and is carried out by the following means: Secured to a rock shaft 356 (Figs. 10 and 13) are side arms 357 of a bail bar 358 which overlies the extensions of pawls 353 and 354. One side arm 357 of said bail has a follower arm extension 359 (Fig. 13) cooperating with a cam 364 secured to shaft 261. The profile of cam 364 is such that during the rotation of the drive shaft 261 it will rock the bail bar 358 downwardly positively rocking the pawls 353 or 354 in such position that they may be relatched by the armatures of magnets 351 and 352.

*Positive restoration of armatures*

In the event that the armatures may stick to the cores the following means is preferably utilized to move the armatures to such position that they may relatch pawls 353 and/or 354. Pivoted on a rod 365 (Fig. 10) is a bail 366 which is to one side of the armatures of all magnets 351 and 352. Said bail is urged by a spring 367 against a stud 368 carried by a side arm 357 of the bail bar 358. When said bail 358 rocks downwardly the pin 368 moves in the same direction, allowing spring 367 to now move bail 366 to the left, thereby engaging any of the armatures of magnets 351 and 352 if they have not been moved by their springs 370 in such position that they would relatch the pawls 353 and 354.

*Means for moving contact operating means free of edge of check*

It will be recalled that the high portion of cam 260a (Fig. 13) is effective after the punching operation to produce an open position of the lateral feeding rollers 212 and 213, thus releasing their hold on the upper part of the check in order that the check may be fed downwardly into the selected sorting compartment. Preliminary to the feeding of the check in this direction arms 203 (Fig. 10) are rocked so as to move ledges 202 and contact operating arms 205 out of cooperation with the bottom edge of the check, also freeing the check at this point. This is effected by means of a cam 375 (Fig. 13) driven by the shaft 261 and which operates upon a follower bell crank 376, one arm of which has a link connection 377 to an arm 378 secured to the shaft 204. Said link 377 has a slot 379 receiving a pin 380 carried by the arm, and a spring 381 extends between the free end of link 377 and the pin 380, as is shown in Figs. 8 and 13. As said spring is normally tensioned it causes the arm 378 and therefore the shaft 204 to be in a position shown in Figs. 10 and 13 to thus cause the pin 380 to occupy the left end of slot 379. A spring 382 is also secured to one arm of follower bell crank 376 and is stronger than the spring 381.

After the printing and punching operation and the separation of feed rollers 212, 213 the high part of cam 375 is effective to rock the follower bell crank 376 clockwise, drawing link 377 to the right and through the pin and slot connection 380—379, arm 378 and shaft 204 will be rocked clockwise, rocking the arms 203 (Fig. 10) to withdraw ledges 202 and contact arms 205 out of cooperation with the bottom edge of the check. The cam 375 is so designed that it will restore arms 203 to normal position after the check has been fed downwardly out of the path of ledges 202. In the event that the width of the check from bottom to top is abnormal and the top portion of the check is in such position that the ledges 202 would contact the check when arms 203 are restored, it will be noted that if obstructed at this place the restoration of link 377 will merely stretch spring 381. Thus, no mutilation of the check will be effected.

*Feeding Punched and printed check to selected compartment*

Other feeding rollers are also provided to feed the check downwardly out of the unit now being described to the basic machine guided by guide plates 200 and 201. To this end there are provided two sets of feeding rollers and in each set there are constantly driven rollers 383 or 384 secured to respective shafts 385 and 386. Referring to Fig. 9, it will be seen that the constantly rotating gear 223 drives a pinion 387 secured to the roller drive shaft 385 and said gear 387 through an intermediate gear 388 drives a gear 389 secured to the lower roller driving shaft 386. Loosely mounted on the shaft 204 are rollers 389a which are in frictional contact with the associated rollers 384, it being obvious that such rollers 389a are constantly rotating. Pivoted on a rod 390 is an arm 391 (Fig. 12) carrying rollers 392 adapted to cooperate with the rollers 383 but such rollers are normally out of contact with the rollers 383 during the setting up of the slides 295 and during the punching and printing operation. After the latter has been completed rollers 392 are moved to the left as viewed in Fig. 12 to frictionally engage the rollers 383. Since the check which has been printed is between such rollers, their engagement causes the rollers to feed the check downwardly until the lower edge is seized by the rollers 384 and 389a which then move the check further downwardly. To establish an engagement between rollers 392 and 383, one of the arms 391 secured to rock shaft 390 has a link connection 393 to an arm 394 through a pin and slot connection comprising a slot 395 in the link 393 and a pin 396 carried by the arm 394. The latter arm is secured to a rock shaft 397 to which is affixed a follower arm 398 urged by a spring 399 so that its roller engages an operating cam 400. At the desired time shown in the timing diagram a low portion 400a of cam 400 allows arm 398 to be rocked by spring 399 counterclockwise, rocking the shaft 397 and arm 394 in the same direction. By means of a spring 401 between pin 396 and the extremity of link 393, said link 393 is moved to the left to thereby rock the rollers 392 into engagement with the rollers 383, thereby seizing the check and since roller 383 is constantly rotating it will move the check downwardly until seized by rollers 384 and 389a which will move the check further downwardly until it is between the feeding rollers 25 of the basic machine.

*Initiation of operation of basic machine*

When the check enters the bite of rollers 25 and in the check receiving chute 407 of the basic machine it will close contacts 405 which close circuits to initiate a cyclic operation of the basic machine which carries out and effects operations which are well known.

Referring to the wiring diagram of Fig. 15, these contacts complete an obvious circuit to clutch control magnets 406. The clutch control magnets 406 of the basic machine are well known and are shown in many patents, one of which is the patent to S. Brand et al., No. 2,146,695, granted February 7, 1939. In Fig. 7 of this patent magnets 180 correspond to the magnets designated 406 in Fig. 15 of the instant case.

Energization of clutch control magnets 406 causes a cyclic operation of the basic machine, among which operations is the automatic rotation of the feeding rollers 25 to thus feed the punched check to the preselected sorting compartment. It is evident, therefore, that the manual insertion of a check in the chute 23 initiates the operation of the unit P forming part of the present invention so that the inserted check is first fed laterally to the proper position. During the operation of the unit P the card is punched and printed with an amount corresponding to that set up in the ten-key keyboard of the basic machine after which it is automatically ejected from the unit to the feeding chute 407 of the basic machine. The disposition of the punched check in said check receiving chute 407 automatically initiates the operation of the basic machine which rotates feed rollers 25 to carry the check into the selected compartment.

While there have been shown and described and pointed out the fundamental novel features of the invention, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a machine for handling and punching checks of different widths and lengths, the combination of a ten-key keyboard, punching mechanism including punches, a plurality of punch selectors adapted to receive under control of said ten-key keyboard differential movements to select punches of said punching mechanism, a plurality of contact means disposed in a check receiving chute and actuated by the bottom edge of a check when inserted in said chute, feeding rollers for feeding the check laterally in the direction of its length, electromagnetically controlled means under control of said plurality of contact means for causing the operation of said lateral feeding rollers when said bottom edge is square against all of said contact means, further contact means engaged by the side edge of the check when the latter is fed laterally to a predetermined position, means for further feeding a punched check away from said punching mechanism, a gate normally in the path of movement of said check and adapted to hold the check in a punching position in said punching mechanism, electromagnetically controlled means to initiate the operation of said punching mechanism; to cause movement of said gate to release the punched check, and thereafter cause said further feeding means to feed the punched check in the direction of its width away from said punching mechanism, and circuits completed by said further contact means to energize said electromagnetically controlled means.

2. In a machine for handling and punching checks of different widths and lengths, the combination of a ten-key keyboard, digit setup means set up by said keyboard, punching mechanism including punches, a plurality of punch selectors, means under control of said digit setup means to cause said punch selectors to select punches of said punching mechanism, a record receiving chute in which a check is manually inserted to be cooperatively related with said punching mechanism, a plurality of contact means disposed in said record receiving chute and actuated by the bottom edge of a check when inserted in said chute, feeding rollers for feeding the check laterally in the direction of its length, means under control of said plurality of contact means for causing the operation of said lateral feeding rollers when said bottom edge is square against all of said contact means, further contact means engaged by the side edge of the check when the latter is fed laterally to a predetermined position, means for further feeding a punched check away from said punching mechanism, a gate normally in the path of movement of said check and adapted to hold the check in a punching position in said punching mechanism, electromagnetically controlled means to cause said punch selectors to select said punches; to initiate the operation of said punching mechanism; to cause movement of said gate to release the punched check, and thereafter to cause said further feeding means to feed the punched check in the direction of its width and away from said punching mechanism, and circuits completed by said further contact means to energize said electromagnetically controlled means.

3. In a machine for handling and punching checks of different widths and lengths, the combination of a ten-key keyboard, punching mechanism including punches selected by said keyboard, a plurality of punch selectors having interposer means carried thereby adapted to receive under control of said ten-key keyboard differential movements to select by said interposer means punches of said punching mechanism, a plurality of contact means disposed in a check receiving chute and actuated by the bottom edge of a check when inserted in said chute, feeding rollers for feeding the check laterally in the direction of its length, means under control of said plurality of contact means for causing the operation of said lateral feeding rollers when said bottom edge is square against all of said contact means, further contact means engaged by the side edge of the check when the latter is fed laterally to a predetermined position, means for further feeding a punched check away from said punching mechanism, a gate normally in the path of movement of said check and adapted to hold the check in a punching position in said punching mechanism, electromagnetically controlled means to effect the differential movement of said punch selectors; to initiate the operation of said punching mechanism; to cause movement of said gate to release the punched check, and thereafter cause said further feeding means to feed the punched check in the direction of its width away from said punching mechanism, and circuits completed by said further contact means to energize said electromagnetically controlled means.

4. In a machine for handling and punching records, such as checks of variable lengths and widths, the combination of a keyboard, punching means including punches selected by said keyboard, a plurality of contact means disposed in a record receiving chute and actuated by the bottom edge of a check when inserted in said chute, feeding rollers for feeding the check laterally in the direction of its length, means under control of said plurality of contact means for causing the operation of said lateral feeding rollers when said bottom edge is square against all of said contact means, further feeding means to feed the check in a direction of its width out and away from said punching means, electromagnetic control means to initiate the operation of said punching means and said further feeding means, further contact means engaged by a side edge of the check when the latter is fed laterally to a predetermined position, and a circuit completed by said further contact means to energize said electromagnetic control means to initiate the operation of said punching means and thereafter said further feeding means to feed the punched check in the direction of its width out and away from said punching means.

5. A machine as set forth in claim 4 and which includes stop means against which the bottom edge of the check presses and coacts with said bottom edge after said bottom edge has actuated said plurality of contact means to thereby function as a gate for said check, means to move the stop means out of coaction with said bottom edge, and means controlled by said electromagnetic control means to move the stop means out of coaction with the bottom edge of the punched check to release the latter for feeding by said further feeding means.

6. In a punching machine, the combination of a plurality of sets of punches, a series of punch bars, each carrying punch selecting means variously located on the related bar to select in combination one or more punches according to the differential position of the bar, each of said bars being provided with two sets of notches arranged in two planes, each of the notches of one set being disposed one-half step above the notches of the other set, means for effecting an excursion of said bars during each operation of the machine, a pair of pawls, each in the plane of the related set of notches, and normally out of engagement with the notches, a pair of magnets for each bar, each for releasing the related pawl to engage one of the related set of notches to determine the differential position of the bar, a readout structure comprising for each order and related bar a plurality of sets of digit contacts, each in one set for energizing one magnet and each in the other set for energizing the other magnet, and means for reading out one set of contacts for energizing one of said magnets under control of said one set of contacts at times when one set of notches is adapted to be successively coordinated with the related pawl, and separate means for reading out the other set of contacts for energizing the other one of said magnets under control of said other set of contacts at other and relatively different times when the other set of notches is adapted to be successively coordinated with the other pawl.

7. In a punching machine, the combination of a plurality of sets of punches, a differentially positionable punch slide carrying punch selecting means variously located on the slide to select in combination one or more punches according to the differential position of the slide, said slide being provided with one set of "even" digit notches arranged in one plane and another set of "odd" digit notches disposed one-half step above the notches of the other set and in another plane, a pair of pawls, each in the plane of the related set of notches, a plurality of sets of digit representing means, one set representing "odd" digits and the other set representing "even" digits, and means under control of said set of "odd" digit representing means for operating the pawl in the plane of the "odd" representing notches at times when the latter are successively coordinated with said pawl, and means under control of the set of "even" digit representing means for operating the other pawl which is in the plane of the "even" notches at times relatively different when the latter are coordinated with said other pawl.

References Cited in the file of this patent

UNITED STATES PATENTS

| Number | Name | Date |
| --- | --- | --- |
| 1,966,623 | Fuller | July 17, 1934 |
| 1,973,246 | Bryce | Sept. 11, 1934 |
| 2,016,705 | Bryce | Oct. 8, 1935 |
| 2,142,352 | Fuller | Jan. 3, 1939 |
| 2,161,612 | Brand | June 6, 1939 |
| 2,426,951 | Ritzert | Sept. 2, 1947 |
| 2,580,788 | Johnson | Jan. 1, 1952 |